United States Patent [19]

Tavlarides et al.

[11] Patent Number: 5,817,239
[45] Date of Patent: Oct. 6, 1998

[54] METHOD OF REMOVING HEAVY METAL IONS FROM A LIQUID WITH CHEMICALLY ACTIVE CERAMIC COMPOSITIONS WITH AN HYDROXYQUINOLINE MOIETY

[75] Inventors: Lawrence L. Tavlarides, Fayetteville; Nandu Deorkar, Syracuse, both of N.Y.

[73] Assignee: Syracuse University, Syracuse, N.Y.

[21] Appl. No.: 788,397

[22] Filed: Jan. 27, 1997

Related U.S. Application Data

[62] Division of Ser. No. 313,426, Sep. 27, 1994, Pat. No. 5,668,079.

[51] Int. Cl.[6] .............................. B01D 15/00; C02F 1/28
[52] U.S. Cl. ........................ 210/661; 210/679; 210/681; 210/682; 210/688
[58] Field of Search .................... 210/661, 669, 210/670, 679, 688, 912, 913, 914, 681, 682

[56] References Cited

U.S. PATENT DOCUMENTS

| | | | |
|---|---|---|---|
| 3,886,080 | 5/1975 | Schucker et al. | 252/176 |
| 4,377,555 | 3/1983 | Hancock et al. | 423/6 |
| 4,421,654 | 12/1983 | Plueddemann | 210/698 |
| 4,448,694 | 5/1984 | Plueddemann | 210/682 |
| 4,585,559 | 4/1986 | DeVoe et al. | 210/679 |
| 4,623,638 | 11/1986 | Hayatsu et al. | 502/401 |
| 4,752,398 | 6/1988 | Holbein et al. | 210/679 |
| 4,756,971 | 7/1988 | Virtanen et al. | 428/405 |
| 4,824,576 | 4/1989 | Sood et al. | 210/662 |
| 4,943,375 | 7/1990 | Bradshaw et al. | 210/674 |
| 4,952,321 | 8/1990 | Bradshaw et al. | 210/670 |
| 4,959,153 | 9/1990 | Bradshaw et al. | 210/670 |
| 4,968,434 | 11/1990 | Kaneko et al. | 210/682 |
| 4,975,379 | 12/1990 | Bradshaw et al. | 436/77 |
| 5,039,419 | 8/1991 | Bradshaw et al. | 210/502.1 |
| 5,049,280 | 9/1991 | Raymond et al. | 210/688 |
| 5,078,978 | 1/1992 | Tarbet et al. | 423/22 |
| 5,120,443 | 6/1992 | Bruening et al. | 210/638 |
| 5,175,110 | 12/1992 | Bradshaw et al. | 436/77 |
| 5,190,660 | 3/1993 | Lindoy et al. | 210/670 |
| 5,190,661 | 3/1993 | Bruening et al. | 210/670 |
| 5,316,683 | 5/1994 | Haesebroek et al. | 210/688 |

OTHER PUBLICATIONS

Nakamura et al., 15 *J. Nucl. Sci. and Tech.*, 829–834 (1978).

*Primary Examiner*—Ivars Cintins
*Attorney, Agent, or Firm*—Nixon, Hargrave, Devans & Doyle LLP

[57] ABSTRACT

A composite material useful for removing heavy metal ions from solutions such as aqueous waste streams comprises a ceramic inorganic support such as silica gel which is covalently bonded, through a silane coupling agent, to a hydroxyquinoline ligand or such a support which has been reacted with a silylating agent and then on which is deposited a hydroxyquinoline ligand.

42 Claims, 5 Drawing Sheets

METHOD OF REMOVING HEAVY METAL IONS FROM A LIQUID WITH CHEMICALLY ACTIVE CERAMIC COMPOSITIONS WITH AN HYDROXYQUINOLINE MOIETY

This is a divisional of U.S. application Ser. No. 08/313,426, filed Sep. 27, 1994, now U.S. Pat. No. 5,668,079.

This invention was made with Government support under Contract #R818630-01-1, awarded by the Environmental Protection Agency. The Government has certain right in the invention.

FIELD OF INVENTION

The present invention relates to novel chemically active ceramic compositions and to their preparation and their use for removing metal ions from solutions, especially from aqueous waste streams.

BACKGROUND OF THE INVENTION

Many industries utilize heavy metals and/or rare earth metals in their manufacturing processes. Such use typically results in liquid (generally aqueous) waste streams that contain residues of the rare earth or heavy metals utilized in the given manufacturing process. For example, the waste streams resulting from electronics, electroplating, and photographic processes typically contain metal ions such as copper, nickel, zinc, chromium (III), chromium (VI), cadmium, aluminum, lead, antimony, silver and gold, amongst others in various aqueous solutions such as sulfates, chlorides, fluoroborates and cyanides. Because of the potential adverse effect of such substances on health and the environment, the removal of rare earth metals and heavy metal ions from aqueous waste streams is a problem of continuing significance.

For the purposes of the present invention, heavy metals will be defined generally as elements having atomic numbers greater than 20, as defined by the Periodic Chart of the Elements and are metallic at ambient conditions. Rare earth metals are defined as those heavy metals having atomic numbers 57 through 71 inclusive. Actinides are those heavy metals having atomic numbers greater than 89. For example, aluminum, arsenic, antimony, copper, nickel, zinc, chromium, cadmium, mercury, platinum, palladium and gold are all heavy metals typically found in the waste stream of common manufacturing processes. In addition, cesium and strontium (and other radioactive metals) are found in aqueous waste streams in the nuclear industry.

The conventional and predominant method of treatment of the waste streams described above is the precipitation of the metal ions in the form of hydroxides or carbonates. That method of removing heavy metals is largely undesirable because it results in a sludge that is difficult and/or expensive to remove and separate from the waste stream. Furthermore, the recovered sludge is typically deposited in a hazardous waste site, raising additional environmental concerns. Finally, it is difficult to separate the individual metal from the resultant sludge for recycling back into the manufacturing process. Other recovery methods include evaporation, reverse osmosis, ion exchange, electrolytic metal recovery, and solvent extraction. These methods, however, have varying levels of success and do not typically allow for the quick and inexpensive separation and removal of the individual metals from the waste streams.

Another common technique for the separation and recovery of rare earths is solvent extraction. However, the main difficulty in a solvent extraction recovery process arises from the low concentration at which these metal ions exist in the aqueous stream generated from hydrometallurgical processes. Also, the identical complexing behavior of all the rare earths due to their similar ionic sizes and chemistry limits the ability to separate out the individual rare earth metals from the sample collected in the solvent extraction process. See Nakamura, Tachimori and Sato, 15 *Journal of Nuclear Science and Technology,* 829–834 (1978).

A more recent method of removing metals from waste streams features using compositions which include chelating agents that are bound to inorganic carriers. Chelating agents, also known as multidentate ligands, are compounds which are capable of complexing with various metal ions in solution where one chelation molecule has the capacity to attach a metal ion at two or more positions. Those chelating agents are molecules which contain one or more of the same donor atom (e.g., "electron sufficient" atoms such as oxygen, nitrogen, sulfur etc.) or two or more different donor atoms through which coordinate and/or covalent bonds are formed between the metal ion and chelating agent. One such composition is disclosed in U.S. Pat. No. 3,886,080 to Schucker et al. ("Schucker"). Schucker discloses a composition in which a chelating agent has been rendered immobile or insoluble by chemically coupling a chelating agent, selected from a defined group of chelates, by bonding the chelating agent to a silane coupling agent using a diazo linkage. The silane coupling agent, in turn, is bonded to the inorganic carrier.

The compositions defined by Schucker have many disadvantages. Initially, the method of making the compositions disclosed by Schucker inherently limits the types of compounds that can be utilized in the composition. For example, the only chelating agents that can be used are those compounds having an unsaturated ring structure. Furthermore, because the chelate and the silane coupling agent are bound by a diazo linkage, it is obvious that only compounds capable of forming such a linkage can be used to produce the composition. Furthermore, the Schucker process for making the compositions is a five step process. The large number of steps required can result in decreased capacities (i.e., the amount of metal the composition is capable of chelating) due to the aggregate inefficiency of the chemical reactions utilized to produce a given composition. Lastly, the Schucker compositions are not capable of separating individual metals and, therefore, are not useful in metal recovery processes which seek to recycle individual metals back into the manufacturing process from which they came. Accordingly, there exists a need for more cost efficient processes for the separation and removal of heavy metal and/or rare earth metals from waste streams by producing compositions having a variety of chelating agents which are specific and selective toward desired metal ions.

SUMMARY OF THE INVENTION

The present invention relates to the preparation and use of chemically active ceramic compositions for separating heavy metal ions from waste streams, especially aqueous waste streams. More particularly, the present invention relates to various compositions that have very high capacities for chelating heavy and/or rare earth metals and can be readily designed to selectively remove individual metals. Furthermore, the present invention relates to methods of making and using those compositions.

In one embodiment of the present invention, disclosed is a composite material having formula (I) below:

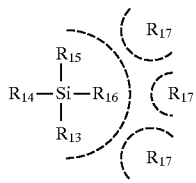
(II)

wherein:
R$_4$ is

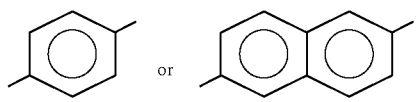
(1)

(2) —(CH$_2$)$_a$—NH—[(CH$_2$)$_b$—NH]$_c$—, wherein a is an integer from 1–5, b is an integer from 1–10 and c is an integer from 0–10,

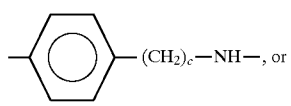
(3)

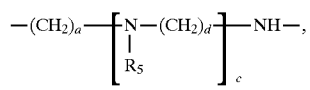
(4)

wherein d is an integer between 2–10;
at least one of R$_1$, R$_2$ and R$_3$ is SUPPORT-O-; and
other of R$_1$, R$_2$ and R$_3$ are the same or different and are unsubstituted or halosubstituted hydrocarbon chain having 1–5 carbon atoms; and
R$_5$ is a ligand having the formula:

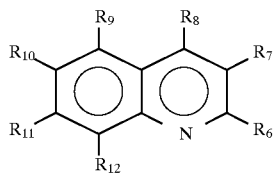

wherein R$_6$, R$_7$ and R$_8$ are the same or different and are —H, —CH$_3$ or —C$_2$H$_5$;
one of R$_9$ and R$_{10}$ is —(CH$_2$)$_e$—, the other of R$_9$ and R$_{10}$ is —H, —CH$_3$ or —C$_2$H$_5$, and e is an integer between 1–25; and
R$_{11}$ is —H, —CH$_3$ or —C$_2$H$_5$ and R$_{12}$ is a hydroxy group or R$_{11}$ is a hydroxy group and R$_{12}$ is H; and
wherein said R$_5$ is linked to said R$_4$ at either said R$_9$ or R$_{10}$ that is —(CH$_2$)$_e$— of said R$_5$.

A second embodiment of the current invention disclosed is a composite material prepared by solvent deposition on silylated surfaces having formula (II) below:

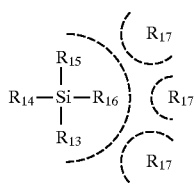
(II)

wherein at least one of R$_{13}$, R$_{14}$, and R$_{15}$ is SUPPORT-O- and R$_{16}$ is unsubstituted or lower alkyl or lower aryl substituted hydrocarbon chain having 1–20 carbon atoms,

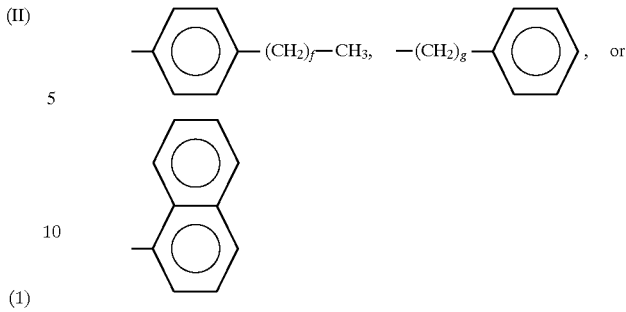

wherein f is an integer between 0–20 and g is an integer between 1–10; and other of R$_{13}$, R$_{14}$, and R$_{15}$ are R$_{16}$; and R$_{17}$ is a ligand having the formula

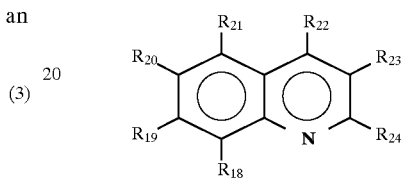

wherein one of R$_{19}$, R$_{20}$, R$_{21}$, and R$_{22}$ is unsubstituted or lower alkyl substituted hydrocarbon chain having 5–25 carbon atoms; and
other of R$_{19}$, R$_{20}$, R$_{21}$, and R$_{22}$ are the same or different and are —H, —CH$_3$ or —C$_2$H$_5$; and R$_{23}$ and R$_{24}$ are same or different and are —H, —CH$_3$ or —C$_2$H$_5$; and
R$_{18}$ is an hydroxy group or R$_{19}$ is an hydroxy group and R$_{18}$ is H; and
wherein said R$_{17}$ is adsorbed on R$_{16}$.

Methods of making the composite material of Formulae (I) and (II) are also disclosed. A method of making the composite material of formula (I) includes the step of covalent bonding a ligand which is 7-hydroxyquinoline or 8-hydroxyquinoline, or derivative thereof, to an inorganic support through silane coupling agents. Methods of making of the composite material of formula (II) include reaction of an inorganic ceramic support with a silylating agent under conditions effective to render the surface of the inorganic ceramic support hydrophobic and depositing a ligand which is 7-hydroxyquinoline or 8-hydroxyquinoline substituted with a hydrocarbon chain on the hydrophobic surface of the inorganic support.

Also disclosed is a method of removing heavy metal ions from a liquid stream comprising the step of contacting the stream with a composite material according to formulae (I) and (II) under conditions effective to complex heavy metal ions on the composite material.

DETAILED DESCRIPTION OF THE INVENTION

Figure 1:
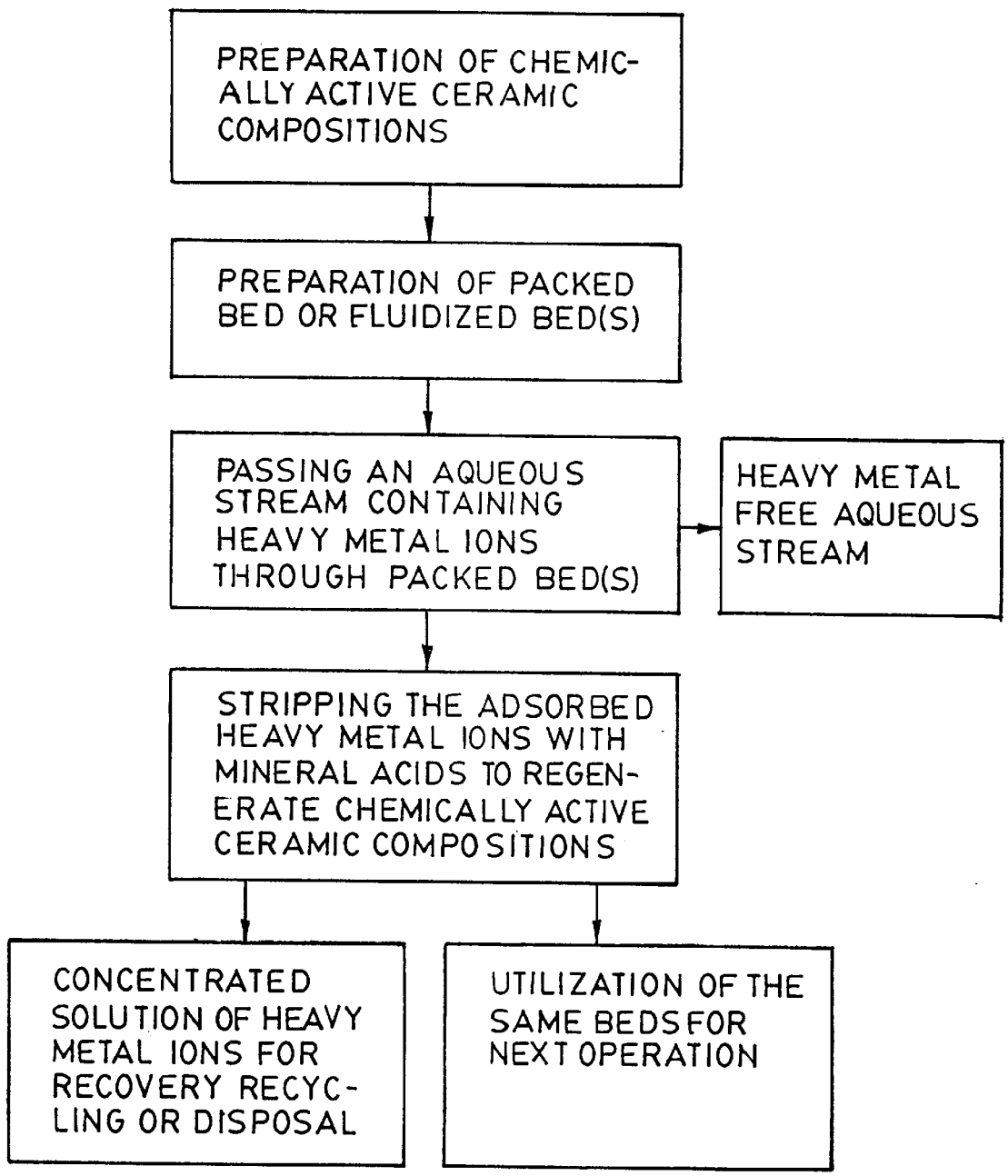
FIG. 1 is a flow chart of the process for separation and recovery of heavy metal ions with chemically active ceramic compositions.

The present invention relates to the preparation and use of chemically active ceramic compositions for removing metal ions from waste streams, especially aqueous waste streams. More particularly, the present invention relates to various compositions that have very high capacities for chelating heavy and/or rare earth metals and can be readily designed to selectively remove individual metals. Furthermore, the present invention relates to methods of making and using those compositions.

The ceramic inorganic carriers useful to prepare the compositions of the present invention are those ceramic materials having terminal hydroxy groups. For example, alumina, titanium oxide, zirconium oxide, and silica-alumina are all useful in the compositions of the present invention. Silica gels are preferred due to the high density of hydroxy groups per unit surface area, higher overall surface area, and varying particle size. The silica gels preferred for use in the present compositions are in the form of particles (e.g., beads) having a diameter generally in the range of 3 mesh (about 0.635 cm) to 270 mesh (about 53 $\mu$m), Tyler screen scale. Most preferably, the silica gel beads used in accordance with the present invention have a diameter in the range of 14 to 270 mesh, have surface area of about 350 to 600 m$^2$/gm and pore sizes (diameters) of about 40 to 150 angstroms. For the purposes of the present invention, the inorganic carrier portion of the inventive composite materials shall hereafter be designated "SUPPORT". According to one aspect of the present invention, chemical compounds used as linking groups (i.e., groups which attach the chelating agent to the support) provide a linking chain between the chelating agent and the support to effect covalent bonding. This linkage is achieved by covalently bonding one end of the linking group to the support and another end of the linking group to the chelation agent. In the former case, the covalent bond is formed after removal of the hydrogen from the hydroxyl groups of the support. The covalent bonding site on the support is designated herein as "SUPPORT-O-". In another aspect of the present invention, a silylating agent is covalently attached to the support and provides a hydrophobic surface suitable for effecting adsorption of a chelating agent on to the support.

In one embodiment of the present invention, the composite material useful for removing heavy metals from waste streams has Formula (I) below:

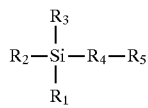

(I)

wherein $R_4$ is

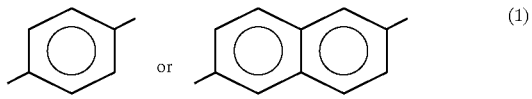

(1)

(2) $(CH_2)_a$—NH—$[(CH_2)_b$—NH$]_c$—, and a is an integer from 1–5, and b is an integer from 1–10 and c is an integer from 0–10, or

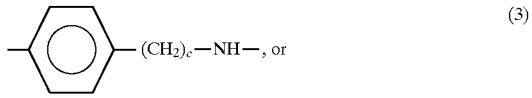

(3)

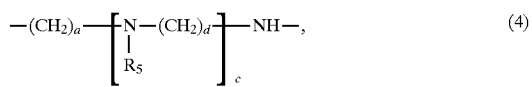

(4)

wherein d is an integer from 2–10;

at least one of $R_1$, $R_2$ and $R_3$ is SUPPORT-O-; and other of $R_1$, $R_2$ and $R_3$ are the same or different and are unsubstituted or halosubstituted hydrocarbon chain having 1–5 carbon atoms; and $R_5$ is a ligand having the formula:

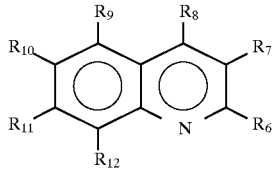

wherein $R_6$, $R_7$ and $R_8$ are the same or different and are —H, —CH$_3$ or —C$_2$H$_5$;

one of $R_9$ and $R_{10}$ is —(CH$_2$)$_e$—, other of $R_9$ and $R_{10}$ is —H, —CH$_3$ or —C$_2$H$_5$, and e is an integer between 1–25; and $R_{11}$ is —H, —CH$_3$ or —C$_2$H$_5$ and $R_{12}$ is a hydroxy group or $R_{11}$ is a hydroxy group and $R_{12}$ is H; and wherein said $R_5$ is linked to said $R_4$ at either said $R_9$ or $R_{10}$ that is —(CH$_2$)$_e$— of said $R_5$.

Preferably, only one of $R_1$, $R_2$ and $R_3$ are SUPPORT-O- to maximize the amount of ligand attached to the surface of the inorganic ceramic substrate. In addition, most preferably, $R_6$, $R_7$, and $R_8$ are —H, $R_9$ is —(CH$_2$)$_e$—, $R_{10}$ and $R_{11}$ are —H, and $R_{12}$ is —OH.

In a second embodiment of the present invention, the composite material useful for removing heavy metals from waste streams has formula (II) below:

(II)

wherein at least one of $R_{13}$, $R_{14}$, and $R_{15}$ is SUPPORT-O- and $R_{16}$ is unsubstituted or lower allyl or lower aryl substituted hydrocarbon chain having 1–20 carbon atoms,

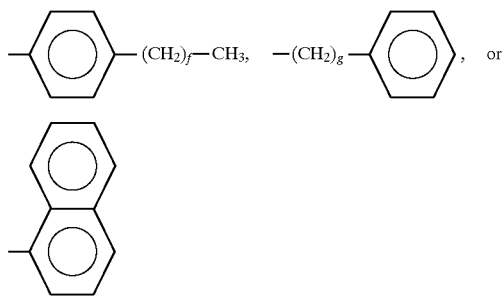

wherein f is an integer between 0–20 and g is an integer from 1–10; and other of $R_{13}$, $R_{14}$, and $R_{15}$ are $R_{16}$; and $R_{17}$ is a ligand having the formula

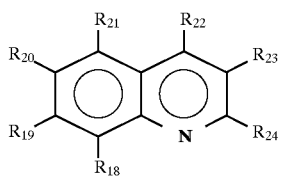

wherein one of $R_{19}$, $R_{20}$, $R_{21}$, and $R_{22}$ is an unsubstituted or lower alkyl substituted hydrocarbon chain having 5–25 carbon atoms; and other of $R_{19}$, $R_{20}$, $R_{21}$, and $R_{22}$ are the same or different and are —H, —$CH_3$ or —$C_2H_5$; and $R_{23}$ and $R_{24}$ are same or different and are —H, —$CH_3$ or —$C_2H_5$; and $R_{18}$ is an hydroxy group or $R_{19}$ is an hydroxy group and $R_{18}$ is —H; and wherein said $R_{17}$ is adsorbed on $R_{16}$. Preferably only one of $R_{13}$, $R_{14}$, and $R_{15}$ are SUPPORT-O- which increases the extent of the hydrophobic nature of the surface. In addition, most preferably $R_{18}$ is an hydroxy group, $R_{19}$ is an unsubstituted or lower alkyl substituted hydrocarbon chain having 5–25 carbon atoms, especially a group having the structure

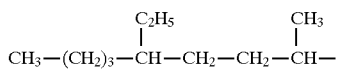

and $R_{20}$, $R_{21}$, $R_{22}$, $R_{23}$, and $R_{24}$ are —H.

The materials of the present invention can be made by deposition of the ligand on the surface of the inorganic ceramic support. First, the support surface is modified to create a hydrophobic surface by silinization. Suitable silylating agents include dimethyldichlorosilane, trimethylchlorosilane, tri-hexylchlorosilane, n-octadecyltrichlorosilane. A preferred silylating agent is dimethyldichlorosilane. Alternatively, the support's surface can be rendered hydrophobic through the use of grignard reagents (e.g., propylmagnesium chloride, decylmagnesium bromide, octadecylmagnesium chloride).

Silylation can be accomplished by dissolving the silylating agent or Grignard reagent in a suitable solvent (e.g., toluene, carbon tetrachloride, chloroform, nitrobenzene, diethyl ether) and contacting the support with the resulting solution for 3 to 12 hours at a temperature of 40° to 90° C. Preferably 6–8 hours at a temperature of 65°–70° C.

After the surface of the support has been rendered hydrophobic, the ligand can be deposited on the surface by contacting the support with a solution of the ligand in a suitable solvent (e.g., toluene, carbon tetrachloride, chloroform, nitrobenzene). A preferred solvent is carbon tetrachloride. The percentage of ligand in the deposition solution is in the range of about 0.5 to 20.0%, preferably 3.0 to 6.0%, by volume. This solution is slurried with the silinized silica gel, and the slurry is heated from about 40° to 60° C. under light vacuum (about 28 to 23 mm/Hg) until the solvent has evaporated. Upon the solvent's evaporation, the ligand is deposited on the surface of the silinized support.

Alternatively, the compositions of the present invention can be produced by covalent attachment of the ligand to the surface of the support via the following different routes.

Route A:
i) Preparation of suitable derivatives of the ligand to have an active group which can bond to the linking group.
ii) Preparation of an organic-silicon derivative of the ligand via reaction with linking groups such as γ-aminopropyltriethoxy silane, γ-aminopropyltrimethoxy silane, N-β-aminoethyl-γ-aminopropyltrimethoxy silane, or 3-chloropropyltrimethoxy silane.
iii) Attaching prepared organo-silicon derivative of the ligand to ceramic support.

Route B:
i) Preparation of suitable derivative of the ligand to have an active group which can bond to the linking group.
ii) Preparation of amine modified surfaces of ceramic support by reacting ceramic support with silane coupling agents such as γ-aminopropyltriethoxy silane, and N-β-aminoethyl-γ-aminopropyltrimethoxy silane.
iii) Substitution reaction at the amine group of the amine-modified support with a derivative of the ligand.

Route C (Friedel-Crafts reactions):
i) Reaction of chloromethylated ligand with phenyl modified support prepared by reaction of ceramic support with silane coupling agents such as triphenylchlorosilane, diphenyldichlorosilane and trichlorophenylsilane.
ii) Reaction of chlorobenzyl modified support with ligand.

Preferably, Route A can be used. A chloromethylated ligand can be prepared, for example, by reacting 8-hydroxyquinoline with formaldehyde and hydrochloric acid. That derivative is further reacted with γ-aminopropyltriethoxysilane in the presence of trimethylchlorosilane and triethylamine and nitrobenzene. Next, the prepared organosilicon derivative is reacted with the support to obtain hydroxyquinoline modified silica gel. A sample of this sequence of reactions is described in further detail in Example 2 below.

The compositions of the present invention have the capability of removing, in a selective manner, heavy metal ions in dilute solutions from aqueous streams. The compositions of the present invention in general can be used for removal from aqueous streams of heavy metals such as antimony, arsenic, beryllium, cadmium, chromium, copper, lead, mercury, nickel, selenium, silver, thallium, tin, zinc, molybdenum, palladium, platinum, silver, gold, cobalt, technitium, rhenium, cesium, strontium and rare earth metals such as cerium, neodymium, and praseodymium.

Typically, the compositions of the present invention are placed in packed beds or fluidized beds and the waste stream is passed through the bed. The compositions act to chelate with the unwanted metal ions, even if the ions are present in only dilute concentrations. Examples of useful beds for the chelating compositions described herein are found in U.S. Pat. Nos. 4,824,576 to Sood et al. and 4,448,694 to Pleuddemann, the disclosures of which are hereby incorporated by reference.

Figure 2:
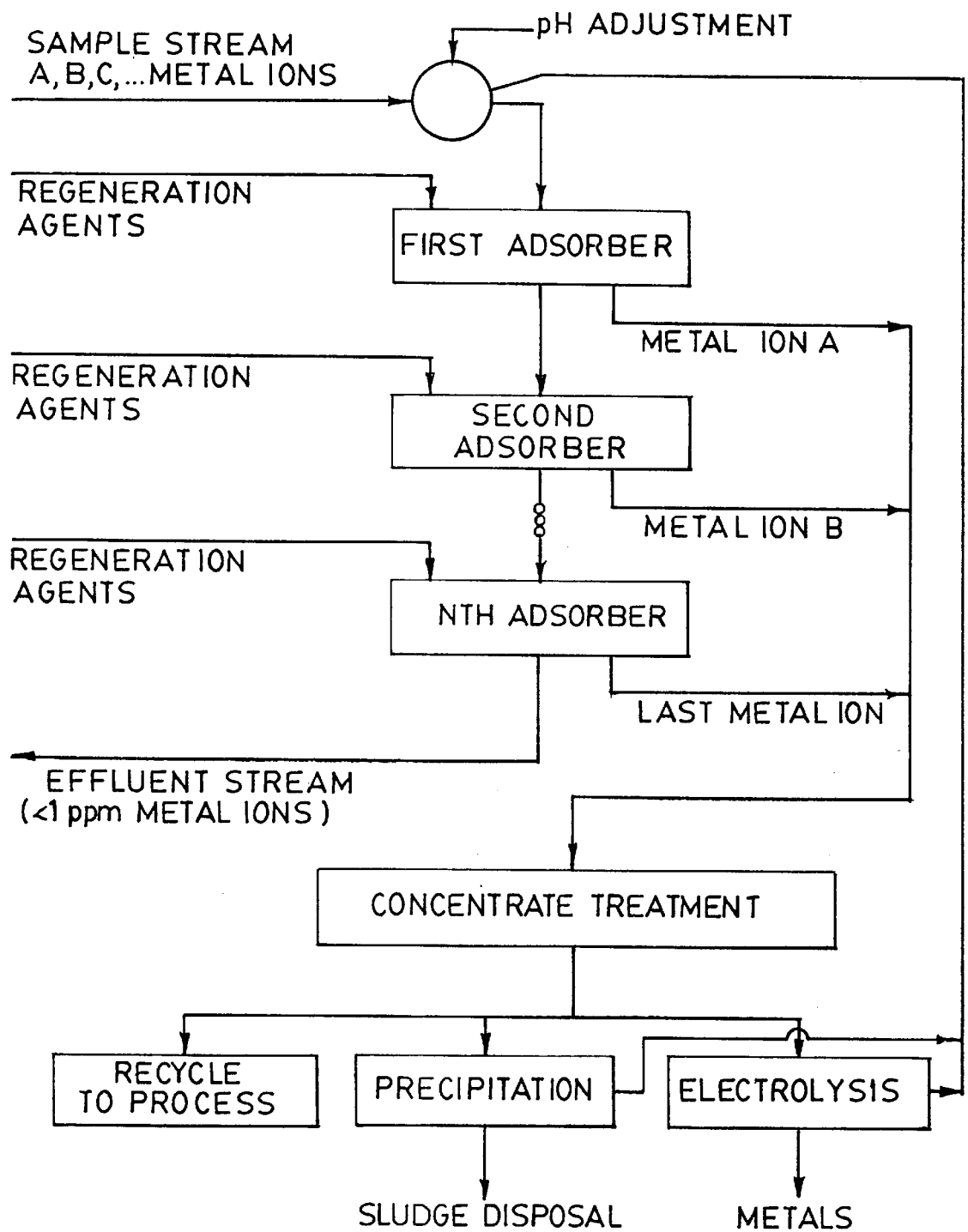
FIG. 2 is a flow chart illustrating the process of the invention by using different inventive compositions in a series of multiple adsorbent beds for metal ion separation and/or metal recovery.
Figure 3:
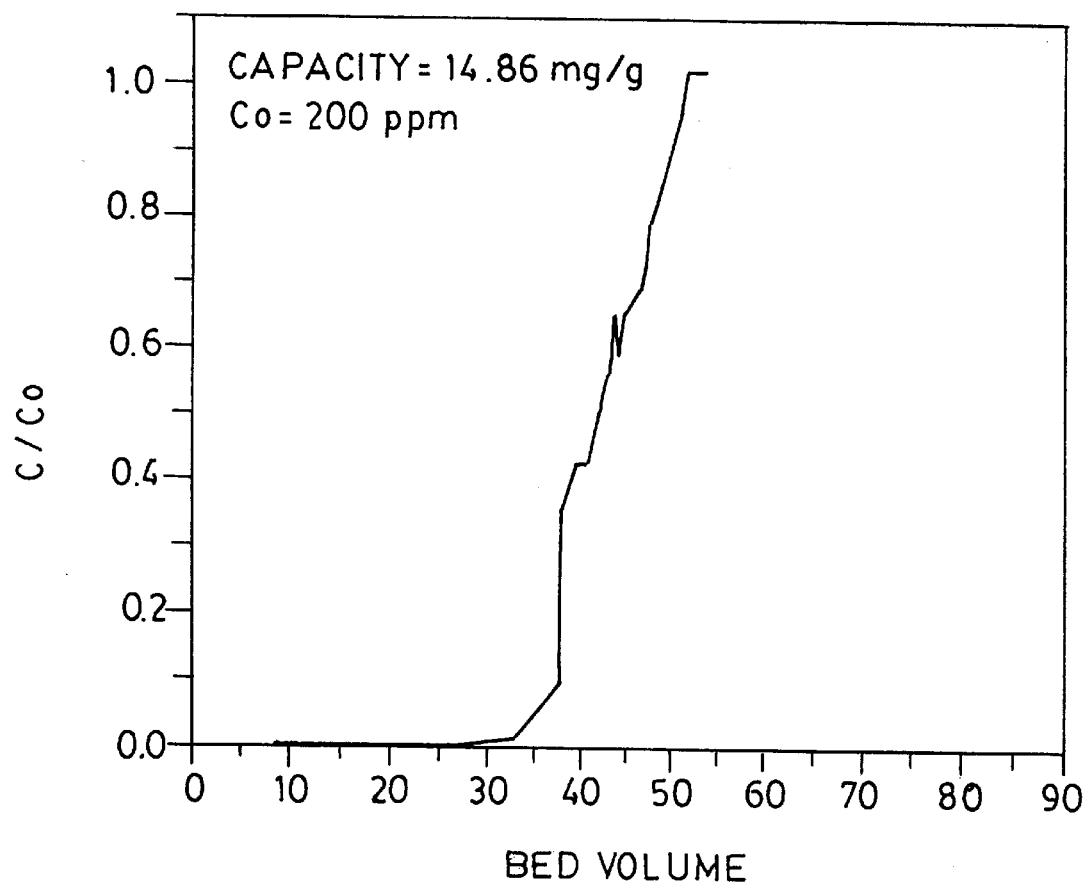
FIG. 3 illustrates the relationship between the ratio of lead ion concentration in an effluent stream to the lead ion concentration in a feed stream versus the bed volumes passed through a column of a composition prepared according to the present invention.
Figure 4:
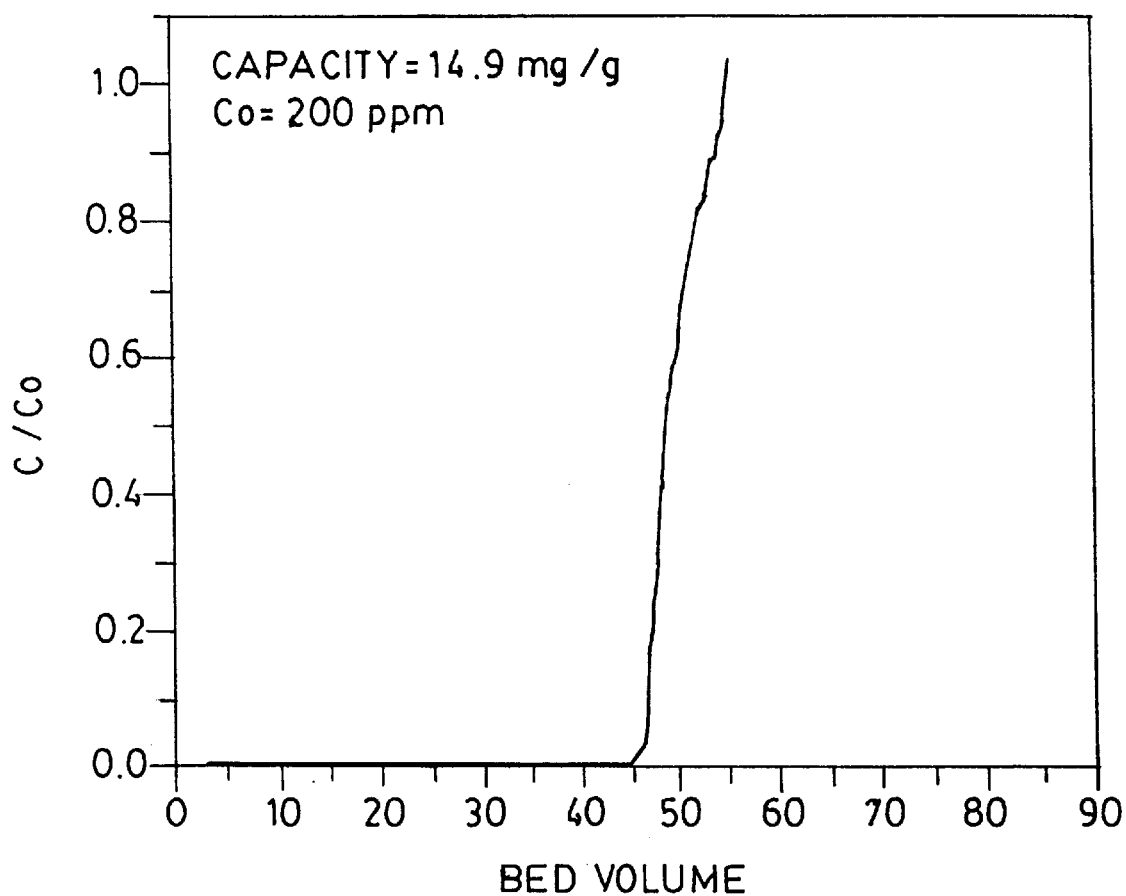
FIG. 4 illustrates the relationship between the ratio of lead ion concentration in an effluent stream to the lead ion concentration in a feed stream versus the bed volumes passed through a column of a second composition prepared according to the present invention.
Figure 5:
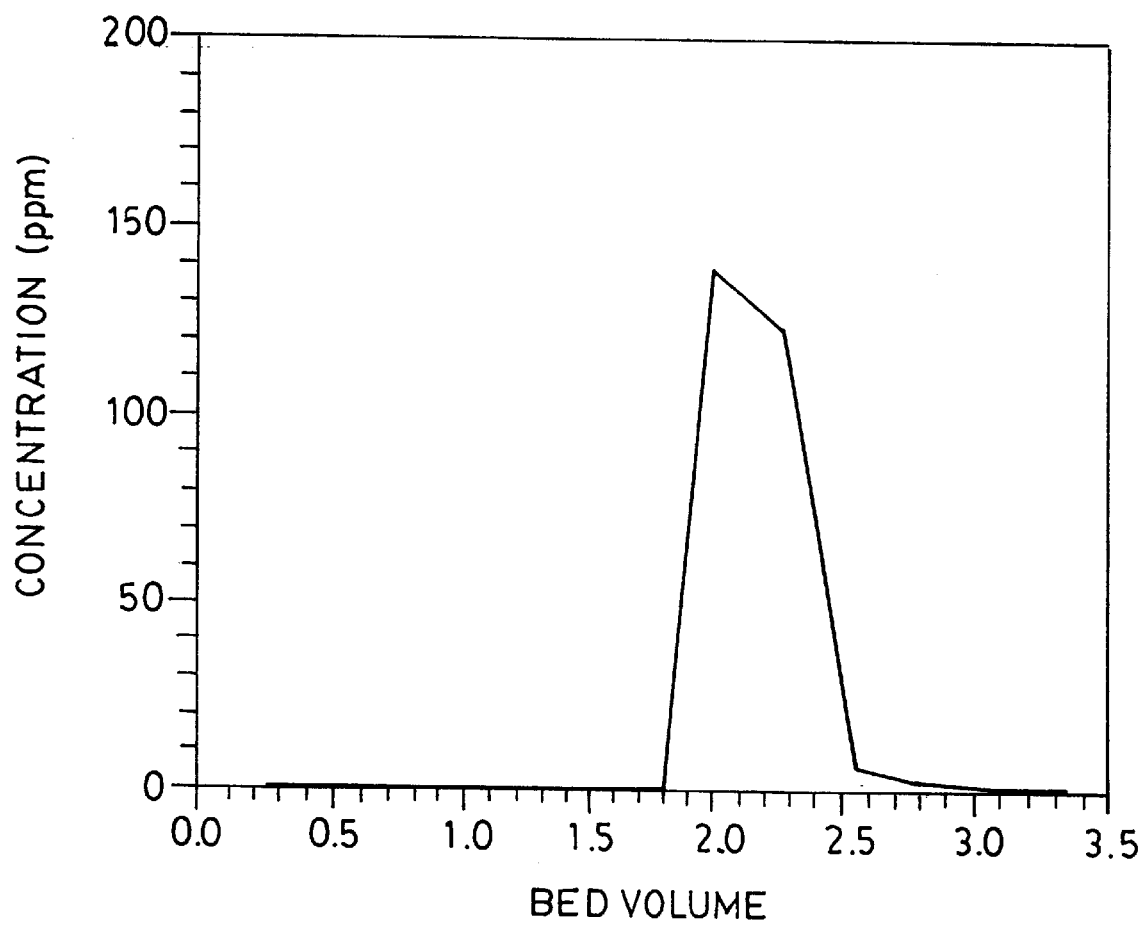
FIG. 5 illustrates the relationship between the lead ion concentration in an effluent stream versus the bed volumes of a strip solution passed through a column of a composition prepared according to the present invention which is initially loaded with a known amount of lead.

The compositions of the present invention can be used for removal and recovery of heavy metal ions by a variety of methodologies as outlined by FIGS. 1 and 2. FIG. 1 is a process outline for separation and recovery of metal ions with chemically active inorganic carriers. FIG. 2 is a flow sheet illustrating the process of the invention by using a series of multiple adsorbent beds for metal ion separation and/or metal recovery.

The process of metal ion removal of the present invention contemplates several modes of operation. Many factors are considered in choosing the appropriate methodology, including the composition of the aqueous stream to be treated, the industrial process through which the contaminated aqueous stream is generated, the desired purification level of the aqueous stream, the degree of separation of metal ions from the waste stream desired, and the end use of the effluent from the bed.

In one embodiment of the present process, an operation mode can be employed to remove all metal ions simultaneously from an aqueous stream containing multiple metal ions by passing the stream through a single adsorbent packed bed or fluidized bed containing a composition according to the present invention. The column breakthrough volume (e.g., the volume at which minimum threshold concentration of metal ions in the effluent is exceeded) can be determined by monitoring the metal ion concentration in the effluent with an atomic absorption spectrophotometer, flow injection analysis, ion selective electrodes, or other known methods of metal ion concentration analysis and/or monitoring pH of the effluent.

The loaded column (extent of column saturation where breakthrough volume occurs) can be regenerated by desorbing the adsorbed metal ions from the column. The adsorbed metal ions can be recovered simultaneously by, for example, stripping all metals from a bed of chemically active silica gel with mineral acid (i.e., nitric acid, hydrochloric acid), as discussed supra. Upon regeneration, the chemically active inorganic carrier bed can be used for the next operation. The metal ion concentrate obtained during regeneration can be used to recover metals present by any one of two techniques or disposed of the metals as a sludge as illustrated in FIG. 2. In the first recovery method, the metals are recovered by electrolysis. The second method involves recycling the metal concentrate back to the process which first generated the polluted aqueous stream. In the third method, the metals can be precipitated to form sludge which can subsequently be disposed of in an environmentally safe manner.

In accordance with the present invention, it has been unexpectedly discovered that the efficiency of the removal process relative to certain metal ions is dependent on the pH of the waste stream. Therefore, as shown in FIG. 2, the pH of the waste stream can be advantageously adjusted if necessary (depending on the composite material used). This operation process is typically performed by buffering an aqueous stream entering the bed of chemically active ceramic composition. Alternatively, instead of employing a buffer solution, it is possible to use a dilute ammonium hydroxide solution to simply adjust the pH of an acidic aqueous stream entering the packed or fluidized bed of chemically active inorganic carrier. In that case, because the inventive materials are acidic in nature and release protons when they adsorb metal ions, the pH of the effluent stream decreases as additional bed volumes pass through the bed. The pH of the effluent stream decreases and reaches a minimum value whereby it becomes acidic. The inventive materials have a preferred pH band at which the adsorption efficiency for each metal ion is maximized. A pH below that pH is defined as acidic for the purposes of the present invention. At that pH, the adsorption of metal ions on the composite bed has been found to decrease. That point is termed the "breakthrough point" and can be determined by monitoring the pH of the effluent stream or by monitoring the metal ion concentration in the effluent aqueous stream.

At the breakthrough point, the flow of aqueous stream through the bed can be stopped, and the bed can be made operational again by passing one or more bed volumes (i.e., an amount of fluid equal to the volumetric fluid capacity of the bed) of buffer solution through the bed. Buffering the column reestablishes the initial pH and extends the adsorptive life of the column and allows its use for the adsorption of metal ions until the column approaches its adsorption capacity (i.e., the point at which substantially all of the available sites for chelation of heavy metal ions are occupied) as determined by the column's breakthrough volume.

Adjusting the fluid stream pH with ammonium hydroxide (rather than using a buffer at the start) is highly advantageous because it decreases the cost of operation and minimizes the contamination of the effluent aqueous streams with buffer solutions, enabling environmentally safe disposition of the effluent. It is also possible to determine the breakthrough point by simply monitoring the pH of the effluent stream.

In another embodiment of the present process, all the metal ions in a waste stream containing more than one type of species of metal ion can be simultaneously removed by passing the waste stream through the single bed of chemically active inorganic carriers.

The selectivity of the inventive materials is highly advantageous. For example, a single metal ion from the aqueous stream containing multiple metal ions can be removed by passing the stream through a single packed or fluidized bed of the inventive composite materials where removal, recycling or disposal of only one metal ion is desired. The adsorbed metal ion can be desorbed from the bed of chemically active inorganic carrier with mineral acid. For example, a composite material as described above can be used to remove lead from the aqueous stream buffered to a pH of about 6.5 and containing lead, calcium and magnesium. The adsorbed lead can be recovered by stripping with dilute mineral acids, and the regenerated bed can be utilized for the next operation. The metal ion concentrate can be used to recover, recycle or dispose of lead using techniques such as electrolysis, recycling and precipitation, as discussed above.

The selectivity exhibited by certain of the compositions of the present invention is also highly advantageous due to the high concentration of metal ions such as calcium and magnesium present in typical waste streams that do not need to be removed. In conventional heavy metal-removing beds, nonselective materials remove calcium or magnesium ions (as well as the heavy metal contaminants) and become quickly saturated due to the high concentration of magnesium and calcium in most aqueous waste streams. The bed must then be frequently regenerated (if possible) or replaced. On the other hand, the inventive composite materials selectively remove only the target heavy metal ions (e.g., lead, cadmium). Therefore, the composite material does not become as quickly saturated and can be used for longer periods without regeneration or replacement. As noted more specifically in the Examples (infra) certain of the inventive materials (e.g., the 8-hydroxyquinoline-containing composites) are capable of removing heavy metal ions for many bed volumes and have extraordinarily high adsorption capacities for lead.

In another embodiment of the process of the present invention, metal ions can be separately and specifically removed by adsorbing those metal ions on a series of metal ion selective beds. As illustrated in FIG. 2, the metal ions can be removed in a sequential manner from the aqueous stream containing a mixture of multiple metal ions by passing the stream through the multiple beds where each bed contains an inventive composite that selectively removes one of the metal ions. The breakthrough point of the beds can be determined by monitoring the metal ion concentration in the effluent stream from the column by the methods discussed supra. These multiple beds can then be regenerated as described above and the metal ions removed from the bed can be recycled or disposed of. The processes and materials of the present invention can completely remove and separate two distinct metal ions and facilitate maximum utilization of the beds' relative capacities, thereby providing valuable increased efficiency in the metal ion removal process.

The present invention is further described by the following non-limiting examples.

EXAMPLES

Example 1

A 50 volume percent ("vol %") solution of dimethyldichlorosilane dissolved in toluene was prepared. The surface of a quantity of silica gel beads having a size of 70–270 mesh (Tyler scale) was silinized by mixing the bead with a magnetic stirrer in a vessel with a refluxing condensor in the dimethyldichlorosilane solution for 6 hours at a temperature of 65° to 70° C. The weight percent ("wt %") of dimethyldichlorosilane relative to the silica gel was 110.4.

Next, β-alkenyl-8-hydroxyquinoline ("βA8-HQ") was dissolved in carbon tetrachloride in an amount sufficient to make a 5.0 volume percent ("vol %") solution. The βA8-HQ solution was mixed with the silinized silica gel. The solvent was removed using a rotary vacuum evaporator at 40° to 60° C. and under light vacuum (about 28 to 23 mm/Hg) until the solvent evaporated, thus depositing the βA8-HQ on the surface of the silinized silica gel. This material is designated as Sample A.

The above procedures were repeated except that 14–30 mesh silica gel beads were substituted for the 70–270 mesh beads of Sample A. This material is designated as Sample B.

Example 2

A 5.0 vol % solution of γ-aminopropyltriethoxysilane was prepared by dissolving γ-aminopropyltriethoxysilane in toluene. Next, (5-chloromethyl)-8-hydroxyquinoline was prepared by passing hydrochloric gas through a solution of 8-hydroxyquinoline in a solution of formaldehyde and concentrated hydrochloric acid. The prepared (5-chloromethyl)-8-hydroxyquinoline (0.026M), was further reacted with the γ-aminopropyltriethoxysilane in toluene solution in the presence of trimethylchlorosilane, methanol, triethylamine and nitrobenzene at 80° C. for 6 hours to prepare a organosilicon derivative of 5-chloromethyl-8-hydroxyquinoline. The prepared organosilicon derivative was reacted with silica gel to obtain 8-hydroxyquinoline modified silica gel.

The composition prepared according to this example was prepared with 70–270 mesh silica gel beads (Sample C) and with 14–30 mesh silica gel beads (Sample D).

Example 3

Sample A beads were packed in a one centimeter ("cm") diameter column to a height of 10 cm to prepare a packed bed. Aqueous solution containing lead ions at a concentration of 200 parts per million ("ppm") or cadmium ions at a concentration of 200 parts per million ("ppm") were flowed throughout the packed column at a flow rate of 1 milliliter per minute to provide approximately 10 minutes of residence or contact time between the solution and the chemically active silica gels. The aqueous solution was buffered at pH 6.5 using acetate buffer.

The capacity of the chemically active silica gel beads for a given metal ion (expressed as milligrams of ion chelated per gram of material ("mg/g")) was determined by performing breakthrough studies on the packed bed. Accordingly, an aqueous solution containing metal ions was passed through the column at a flow rate of 1 ml/minute and the metal ion concentration in the effluent from the column was determined with an atomic absorption spectrophotometer. Thus, capacity of the ceramic compositions was calculated from the total amount of metal ion absorbed on the bed to saturation of the bed.

The concentration of the effluent was measured periodically to determine the number of bed volumes that could be treated by the packed column before the beads were saturated and no longer removed the metal ion from the stream. The initial capacity was calculated at the end of the first period of saturation of the bed. Saturation is defined as a state after which no more metal ions are adsorbed on the bed. Thus, after saturation of the bed the concentration of metal ion in the solution entering the bed (feed solution) is, generally, equal to the concentration of metal ions in the solution coming out of the bed (effluent solution). The packed bed saturated with metal ions was then regenerated by stripping the metal ions from the packed bed using 3.5 bed volumes of 0.5 molar nitric acid. The combined sequence of saturation of the bed with the metal ions from the feed solution and regeneration of the bed by stripping the adsorbed metal ions from the synthesized adsorbents in the bed is denoted as one cycle of operation. The bed was operated for twenty cycles of adsorption and stripping and the capacity was measured at the end of the twentieth cycle to evaluate the durability of the packed bed.

Separate packed beds were also prepared according to the procedures described above using, discretely, Sample B, C and D beads. Likewise, capacity studies were done for each of the Sample B, C and D. The columns according to the above procedure with the exception that the aqueous solution flowed through the Sample B, C and D columns contained only 200 ppm lead. The results are shown in Table I below. The percentage recovery of the lead adsorbed on the bed after the stripping procedure for each sample is represented as "% Recovery."

TABLE I

| Sample→ | A | B | C | D |
|---|---|---|---|---|
| Lead Capacity (mg/g) | | | | |
| Fresh | 14.86 | 3.00 | 13.28 | 9.90 |
| 20 Cycles | 14.80 | — | 14.90 | — |
| % Recovery | 92.0 | 92.7 | 95.5 | 93.9 |

Sample A also exhibited a cadmium capacity of 3.35 mg/g (not shown in Table I). As shown by Table I, each of the Sample A, B, C, and D columns exhibited high capacities for removing lead from an aqueous stream. Furthermore, the results indicate that the beds of the present invention are very durable. The Sample A column had virtually the same capacity after 20 cycles as it did when fresh. The reported capacity of the Sample C column for fresh material is less as compared to the 20th cycle because, during the breakthrough studies for the fresh material all effluent samples were not analyzed for its lead content. Thus, the reported lower capacity is a result of unaccounted lead ions adsorbed on the column. In subsequent cycles, that error was corrected by analysing all effluent samples. The relatively lower capacity of the Sample B and D columns is explained by the decreased surface area of the silica beads used to manufacture the composite materials. Nevertheless, relative to the size of the beads, Samples B and D exhibited good capacities for lead removal. Further, by appropriate modification of the method of preparation of the composite materials, higher coverage density of ligand (concentration of ligand per unit surface area of inorganic carrier) can be obtained to increase capacity. Finally, in each case excellent recovery (over 92%) of the lead ions was achieved. These results are further evidence of the great usefulness of the compositions of the present invention. Unlike most prior art methods of removing heavy metals from waste streams, the inventive materials allow easy removal of the ion from the packed bed either for disposal or, preferably, for recycling back into the original manufacturing process.

Example 4

Example 4 illustrates the relationship between pH and the ability of the compositions of the present invention to remove various metals from solution. Example 4 also illustrates the selectivity of various of the compositions of the present invention under the appropriate conditions.

Sample A and Sample C composite materials prepared according to Examples 1 and 2, respectively, were used to extract various metals from aqueous solution each having a metal ion concentration of 200 ppm. For each sample tested with a specific metal ion, three aqueous solutions, each of 25 ml, having different pHs were equilibrated with one gram of sample for one hour on a shaker apparatus. The pHs of the respective aqueous solutions were maintained at 3.5, 5.0 and 6.5 in each case using acetate buffer. In each case the percent extraction ("% Extraction") was determined by measuring the initial concentration of the given metal ion in the aqueous solution (before it was equilibrated with the samples) and the final concentration of the given metal ion in the aqueous solution (after it was equilibrated with the samples.) The data compiled according to these procedures are listed in Table II below.

TABLE II

| | | % Extraction | |
| --- | --- | --- | --- |
| Metal Ion | pH | Sample A | Sample C |
| Lead (II) | 3.5 | 5.6 | 96.0 |
| | 5.0 | 99.9 | 99.9 |
| | 6.5 | 99.9 | 99.9 |
| Cadmium (II) | 3.5 | 7.18 | 16.02 |
| | 5.0 | 35.73 | 72.12 |
| | 6.5 | 99.9 | 97.2 |
| Calcium (II) | 3.5 | 0.0 | 1.56 |
| | 5.0 | 0.0 | 3.12 |
| | 6.5 | 3.9 | 2.72 |
| Magnesium (II) | 3.5 | 0.0 | 0.0 |
| | 5.0 | 0.0 | 0.0 |
| | 6.5 | 0.0 | 0.0 |
| Nickel | 3.5 | 46.06 | 18.56 |
| | 5.0 | 73.3 | 30.28 |
| | 6.5 | 87.39 | 38.06 |

TABLE II-continued

| | | % Extraction | |
| --- | --- | --- | --- |
| Metal Ion | pH | Sample A | Sample C |
| Zinc | 3.5 | 7.04 | 16.4 |
| | 5.0 | 31.39 | 45.6 |
| | 6.5 | 89.52 | 58.4 |

As illustrated by Table II, the materials of the present invention exhibit advantageous selectivity for certain heavy metal ions. For example, neither Sample A nor Sample C removed a significant percentage of magnesium or calcium, regardless of the pH of the aqueous solution. On the other hand, Sample A and C each removed up to 99.9 percent of some "target" heavy metals (e.g., lead, cadmium) and greater than 87.4% of other "target" materials (e.g., nickel and zinc). That property is extremely useful in removing heavy metals from aqueous waste streams because of the high concentration of magnesium and calcium found in typical water supplies. Without the selectivity of the inventive materials, the packed beds would rapidly become saturated with magnesium and calcium at the expense of capacity that otherwise could be utilized to remove the target heavy metals.

The present example also demonstrate the effect of pH on the operation of the inventive materials. Sample A exhibited much better performance at pHs of 5 or more for lead removal and 6.5 or more for cadmium and zinc removal. Sample C, on the other hand exhibited good performance for lead at all tested pHs, but removed much more cadmium at pHs of 5 or more. The increased or decreased performance of the inventive materials relative to pH conditions can be advantageously exploited. For example, increasing the pH of the waste stream as it enters the packed bed can significantly increase the performance of the bed and result in higher extraction percentages of the target heavy metals.

The pH of the waste stream could also be manipulated to tailor the packed bed's extraction characteristics to the particular properties of the subject waste stream. More specifically, if a waste stream exhibited a large concentration of lead and a relatively lower concentration of cadmium, it would be advantageous to use a composition exhibiting a relatively higher selectivity for lead. In such case, Sample A beads could be used in conjunction with an operation to adjust the pH of the waste stream to about 5.0 and effect more efficient removal of lead rather than the less prevalent cadmium.

Although the present invention has been described in detail for the purpose of illustration, it is understood that such detail is solely for that purpose, and variations can be made therein by those skilled in the art without departing from the spirit and scope of the invention as described by the following claims.

What is claimed is:

1. A method of removing heavy metal ions from a liquid stream comprising the step of contacting the stream with a composite material under conditions effective to complex said heavy metal ions on said composite material, said composite material having the formula:

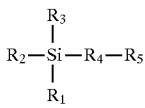

wherein $R_4$ is

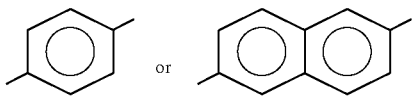

(2) —$(CH_2)_a$—NH—$[(CH_2)_b$—NH$]_c$—, and a is an integer from 1–5, and b is an integer from 1–10 and c is an integer from 0–10, or

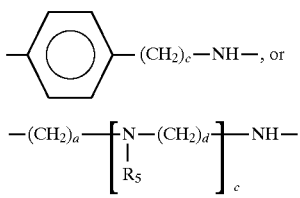

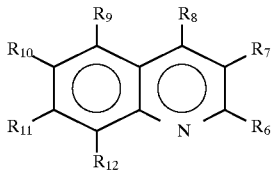

wherein d is an integer between 2–10;
at least one of $R_1$, $R_2$ and $R_3$ is SUPPORT-O-; and
other of $R_1$, $R_2$ and $R_3$ are the same or different and are unsubstituted or halosubstituted hydrocarbon chain having 1–5 carbon atoms; and
$R_5$ is a ligand having the formula:

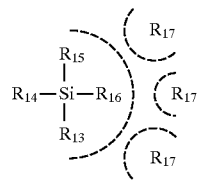

wherein $R_6$, $R_7$ and $R_8$ are the same or different and are —H, —$CH_3$ or —$C_2H_5$;
one of $R_9$ and $R_{10}$ is —$(CH_2)_e$—, other of $R_9$ and $R_{10}$ is —H, —$CH_3$ or —$C_2R_5$, and e is an integer between 1–25; and
$R_{11}$ is —H, —$CH_3$ or —$C_2H_5$ and $R_{12}$ is an hydroxy group or $R_{11}$ is an hydroxy group and $R_{12}$ is —H; and
wherein said $R_5$ is linked to said $R_4$ at either said $R_9$ or $R_{10}$ that is —$(CH_2)_e$— of said $R_5$.

2. A method according to claim 1, wherein only one of $R_1$, $R_2$, and $R_3$ are SUPPORT-O-.

3. A method according to claim 2, wherein $R_6$, $R_7$, and $R_8$ are H, $R_9$ is —$(CH_2)_e$—, $R_{10}$ and $R_{11}$ are —H, and $R_{12}$ is an hydroxy group.

4. A method according to claim 1 wherein $R_1$, $R_2$, $R_3$ are SUPPORT-O-, $R_4$ is —$(CH_2)_a$—NH—$[(CH_2)_b$—NH$]_c$— wherein c is 0 and a is 3.

5. A method according to claim 4, wherein $R_6$, $R_7$ and $R_8$ are H, $R_9$ is —$(CH_2)_e$— wherein e=1, $R_{10}$ and $R_{11}$ are H, and $R_{12}$ is an hydroxy group.

6. A method according to claim 5, further comprising adjusting the pH of said stream to a value above about 5.0, wherein said pH adjusting is prior to contacting said stream with said composite material.

7. A method according to claim 6, wherein said pH of said stream is adjusted to a value above about 6.5.

8. A method according to claim 1, further comprising removing complexed metal ions from said composite material to regenerate said composite material.

9. A method according to claim 1, wherein said stream contains multiple metal ions and said contacting step comprises flowing said stream through a single packed or fluidized bed containing said composite material and removing a selected metal ion or metal ions from said stream containing multiple metal ions.

10. A method as set forth in claim 9 in which the selected metal ion is Pb(II).

11. A method as set forth in claim 9 in which the selected metal ion is Cd(II).

12. A method as set forth in claim 9 in which the selected metal ion is Zn(II).

13. A method as set forth in claim 9 in which the selected metal ion is Cu(II).

14. A method as set forth in claim 9 in which the selected metal ion is Ni(II).

15. A method as set forth in claim 9 in which the selected metal ion is Al(III).

16. A method as set forth in claim 9 in which the selected metal ion is Sr(II).

17. A method as set forth in claim 9 in which the selected metal ion is Th(IV).

18. A method as set forth in claim 9 in which the selected metal ion is Co(III), Co(II), or mixtures thereof.

19. A method as set forth in claim 9 in which the selected metal ion is U(VI), U(IV), or mixtures thereof.

20. A method according to claim 1, wherein said contacting step comprises flowing said stream through a first packed or fluidized bed containing said composite material and then through a second packed or fluidized bed containing said composite material, wherein said first packed or fluidized bed and said second packed or fluidized bed are arranged in series.

21. A method according to claim 20, wherein said first and said second beds contain different composite materials exhibiting different metal ion removal preferences.

22. A method according to claim 20, wherein the pH of said stream is adjusted after leaving said first packed bed and before entering said second packed bed.

23. A method of removing heavy metal ions from a waste stream comprising the step of contacting the waste stream with a composite material under conditions effective to complex said heavy metal ions on said composite material, said composite material having the formula:

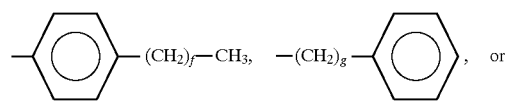

wherein at least one of $R_{13}$, $R_{14}$ and $R_{15}$ is SUPPORT-O- and $R_{16}$ is unsubstituted or lower alkyl or lower aryl substituted hydrocarbon chain having 1–20 carbon atoms, or -continued

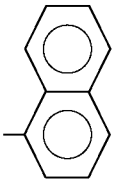

wherein f is an integer from 0–20 and g is an integer between 1–10; and
others of $R_{13}$, $R_{14}$ and $R_{15}$ are $R_{16}$; and
$R_{17}$ is a ligand having the formula

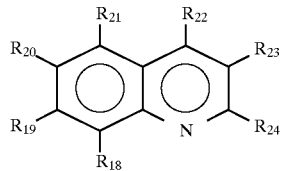

wherein one of $R_{19}$, $R_{20}$ and $R_{21}$ and $R_{22}$ is unsubstituted or lower alkyl substituted hydrocarbon chain having 5–25 carbon atoms; and other of $R_{19}$, $R_{20}$ and $R_{21}$ and $R_{22}$ are the same or different and are H, —$CH_3$ or —$C_2H_5$; and $R_{23}$ and $R_{24}$ are same or different and are —H, —$CH_3$, or —$C_2H_5$; and $R_{18}$ is an hydroxy group or $R_{19}$ is an hydroxy group and $R_{18}$ is H; and wherein said $R_{17}$ is adsorbed on $R_{16}$.

24. A method according to claim 23, wherein only one of $R_{13}$, $R_{14}$ and $R_{15}$ is SUPPORT-O-.

25. A method according to claim 24, wherein $R_{18}$ is an hydroxy group, $R_{19}$ is an unsubstituted or lower alkyl substituted hydrocarbon chain having 5–25 carbon atoms and $R_{20}$, $R_{21}$, $R_{22}$, $R_{23}$ and $R_{24}$ are —H.

26. A method according to claim 23, wherein $R_{13}$ and $R_{14}$ are SUPPORT-O-, $R_{15}$ and $R_{16}$ are —$CH_3$, $R_{18}$ is an hydroxy group, $R_{19}$ has the structure

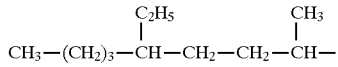

and $R_{20}$, $R_{21}$, $R_{22}$, $R_{23}$ and $R_{24}$ are —H.

27. A method according to claim 26, further comprising adjusting the pH of said stream to a value above about 5.0.

28. A method according to claim 27, wherein the pH of said stream is adjusted to a value above about 6.5.

29. A method according to claim 23, further comprising removing complexed metal ions from said composite material to regenerate said composite material.

30. A method according to claim 23, wherein said stream contains multiple metal ions and said contacting step comprises flowing said stream through a single packed or fluidized bed containing said composite material for removal of a selected metal ion or metal ions from said stream containing multiple metal ions.

31. A method as set forth in claim 30 in which the selected metal ion is Pb(II).

32. A method as set forth in claim 30 in which the selected metal ion is Cd(II).

33. A method as set forth in claim 30 in which the selected metal ion is Zn(II).

34. A method as set forth in claim 30 in which the selected metal ion is Cu(II).

35. A method as set forth in claim 30 in which the selected metal ion is Ni(II).

36. A method as set forth in claim 30 in which the selected metal ion is Sr(II).

37. A method as set forth in claim 30 in which the selected metal ion is Th(IV).

38. A method as set forth in claim 30 in which the selected metal ion is U(VI), U(IV), or mixtures thereof.

39. A method as set forth in claim 30 in which the selected metal ion is Co(III), Co(II), or mixtures thereof.

40. A method according to claim 23, wherein said contacting step comprises flowing said stream through a first packed bed or fluidized bed containing said composite material and then through a second packed or fluidized bed containing said composite material.

41. A method according to claim 40, wherein the composite materials of said first and said second beds have different metal ion removal preferences.

42. A method according to claim 40, wherein the pH of said stream is adjusted after leaving said first bed and before entering said second bed.

* * * * *